(12) United States Patent
Smith

(10) Patent No.: US 11,202,403 B2
(45) Date of Patent: Dec. 21, 2021

(54) SYSTEM AND METHOD FOR DETECTING THE OPERATIONAL STATUS OF A RESIDUE REMOVAL DEVICE OF A SEED-PLANTING IMPLEMENT

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 182 days.

(21) Appl. No.: 16/428,365

(22) Filed: May 31, 2019

(65) Prior Publication Data

US 2020/0375079 A1    Dec. 3, 2020

(51) Int. Cl.
| | | |
|---|---|---|
| A01C 7/00 | (2006.01) | |
| A01B 49/06 | (2006.01) | |
| A01B 63/32 | (2006.01) | |
| A01C 7/08 | (2006.01) | |

(52) U.S. Cl.
CPC .............. *A01C 7/006* (2013.01); *A01B 49/06* (2013.01); *A01B 63/32* (2013.01); *A01C 7/08* (2013.01)

(58) Field of Classification Search
CPC ....... A01B 27/005; A01B 49/06; A01B 63/32; A01C 7/006; A01C 7/08
See application file for complete search history.

(56) References Cited

U.S. PATENT DOCUMENTS

| | | |
|---|---|---|
| 6,253,692 B1 | 7/2001 | Wendling et al. |
| 8,006,775 B2 | 8/2011 | Steinlage et al. |
| 8,408,149 B2 | 4/2013 | Rylander |
| 8,752,642 B2 | 6/2014 | Whalen et al. |
| 8,826,836 B2 | 9/2014 | Van Buskirk et al. |
| 9,137,939 B2 | 9/2015 | Winick et al. |

(Continued)

FOREIGN PATENT DOCUMENTS

EP    3189719 A1    7/2017

OTHER PUBLICATIONS

Dawn Gfx Haydraulic, Remote-Adjust Floating Row Cleaner, Feb. 14, 2019 (5 Pages) http://www.dawnequipment.com/Dawn_Gfx.html.

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A system for detecting the operational status of a seed-planting implement. The system includes a row unit including a frame and a residue removal device coupled to the frame. The residue removal device is configured to remove residue from a path of the row unit. The system further includes a sensor configured to capture data indicative of at least one of a position or an acceleration of the residue removal device. The system further includes a controller configured to monitor the data received from the sensor and compare at least one monitored value associated with the at least one of the position or the acceleration of the residue removal device to a predetermined threshold value set for the residue removal device. The controller is further configured to identify the residue removal device as being plugged when the at least one monitored value differs from the predetermined threshold value.

20 Claims, 4 Drawing Sheets

(56) References Cited

U.S. PATENT DOCUMENTS

| | | | |
|---|---|---|---|
| 9,485,900 B2 | 11/2016 | Connell et al. | |
| 9,743,572 B2 | 8/2017 | Martin | |
| 9,746,007 B2 | 8/2017 | Stoller et al. | |
| 9,752,596 B2 | 9/2017 | Sauder et al. | |
| 9,907,222 B2 | 3/2018 | Adams et al. | |
| 10,091,921 B2 | 10/2018 | Bruck et al. | |
| 2012/0291680 A1* | 11/2012 | Rylander | A01C 7/006 111/139 |
| 2016/0088787 A1* | 3/2016 | Connell | A01B 76/00 701/50 |
| 2017/0273235 A1* | 9/2017 | Kordick | A01C 19/02 |
| 2018/0310466 A1* | 11/2018 | Kovach | A01B 19/02 |
| 2019/0174666 A1* | 6/2019 | Manternach | A01B 79/005 |
| 2019/0239413 A1* | 8/2019 | DeGarmo | A01B 21/08 |
| 2020/0337200 A1* | 10/2020 | Smith | A01B 23/06 |
| 2020/0344943 A1* | 11/2020 | Garner | A01C 7/081 |
| 2020/0344944 A1* | 11/2020 | Wonderlich | A01C 7/105 |

OTHER PUBLICATIONS

Clean Sweep, Easy Row Cleaner Adjustments, Precision Planting, Feb. 13, 2019 (5 pages) https://www.precisionplantingh.com/product/cleansweep.

Take Control from the Cab, 2940 Air Adjust, Yetter Co., (2 pages) http://www.yetterco.com/media-library/documents/Flyers/2940_AIR_Adjust_Series.pdf.

* cited by examiner

SYSTEM AND METHOD FOR DETECTING THE OPERATIONAL STATUS OF A RESIDUE REMOVAL DEVICE OF A SEED-PLANTING IMPLEMENT

FIELD OF THE INVENTION

The present disclosure generally relates to seed-planting implements and, more particularly, to systems and methods for detecting the operational status of a residue removal device of a seed-planting implement based on the monitored position and/or acceleration of the residue removal device.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow forming tools or openers that form a furrow or trench in the soil. One or more dispensing devices of the seed-planting implements may, in turn, deposit the seeds into the furrow(s). After deposition of the seeds, a furrow closing assembly may close the furrow in the soil and a packer wheel may pack the soil on top of the deposited seeds.

In certain configurations, a seed-planting implement may include one or more residue removal devices positioned forward of the opener(s), the closing assembly, and the packer wheel of the seed-planting implement relative to the direction of travel of the implement. In general, the residue removal device(s) are configured to break up and sweep away residue and dirt clods present within the path of the implement. Based on its function, the operation of the residue removal device(s) may affect the performance of other downstream components of the seed-planting implement, such as the furrow closing assembly.

Accordingly, an improved system and method for detecting the operational status of a residue removal device of a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting the operational status of a seed-planting implement. The system includes a row unit including a frame and a residue removal device coupled to the frame. The residue removal device is configured to remove residue from a path of the row unit. The system further includes a sensor configured to capture data indicative of at least one of a position or an acceleration of the residue removal device. The system further includes a controller configured to monitor the data received from the sensor and compare at least one monitored value associated with the at least one of the position or the acceleration of the residue removal device to a predetermined threshold value set for the residue removal device. The controller is further configured to identify the residue removal device as being plugged when the at least one monitored value differs from the predetermined threshold value.

In another aspect, the present subject matter is directed to a method for detecting the operational status of residue removal devices of a seed-planting implement. The implement includes an implement frame, a row unit coupled to the implement frame, and a residue removal device associated with the row unit. The residue removal device is configured to remove residue from the path of the row unit. The method includes controlling, with a computing device, an operation of the seed-planting implement as the implement is being moved across the field. The method also includes monitoring, with the computing device, at least one of a position or an acceleration of the residue removal device based on data received from a sensor associated with the residue removal device. The method further includes comparing at least one monitored value associated with the at least one of the position or the acceleration of the residue removal device to a predetermined threshold value set for the residue removal device. The method additionally includes identifying that the residue removal device is plugged when the at least one monitored value differs from the predetermined threshold value.

In a further aspect, the present subject matter is directed to a seed-planting implement for an agricultural vehicle including an implement frame and a plurality of row units coupled to the implement frame. Each row unit includes a frame and a residue removal device coupled to the frame. The residue removal device is configured to remove residue from the path of the row unit. Each row unit further includes at a sensor associated with the residue removal device of at least one row unit of the plurality of row units. The sensor is configured to capture data indicative of at least one of a position or an acceleration of the residue removal device. The seed-planting implement also includes a controller configured to monitor the data received from the sensor and compare at least one monitored value associated with the at least one of the position or the acceleration of the residue removal device to a second monitored value indicative of at least one of a position or an acceleration of a second residue removal device of a second row unit of the plurality of row units. The controller is further configured to identify the residue removal device as being plugged when the at least one monitored value differs from the second monitored value of the second residue removal device by a given threshold.

In yet another aspect, the present subject matter is directed to a method for detecting the operational status of residue removal devices of a seed-planting implement. The implement includes an implement frame, a row unit coupled to the implement frame, and a residue removal device associated with the row unit. The residue removal device is configured to remove residue from the path of the row unit. The method includes controlling, with a computing device, an operation of the seed-planting implement as the implement is being moved across the field. The method also includes monitoring, with the computing device, at least one of a position or an acceleration of the residue removal device based on data received from a sensor associated with the residue removal device. The method further includes comparing at least one monitored value associated with the at least one of the position or the acceleration of the residue removal device to a second monitored value indicative of at least one of the position or acceleration of a second residue removal device of a second row unit of the plurality of row units. The method additionally includes identifying that the residue removal device is plugged when the at least one monitored value differs from the second monitored value of the second residue removal device by a given threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
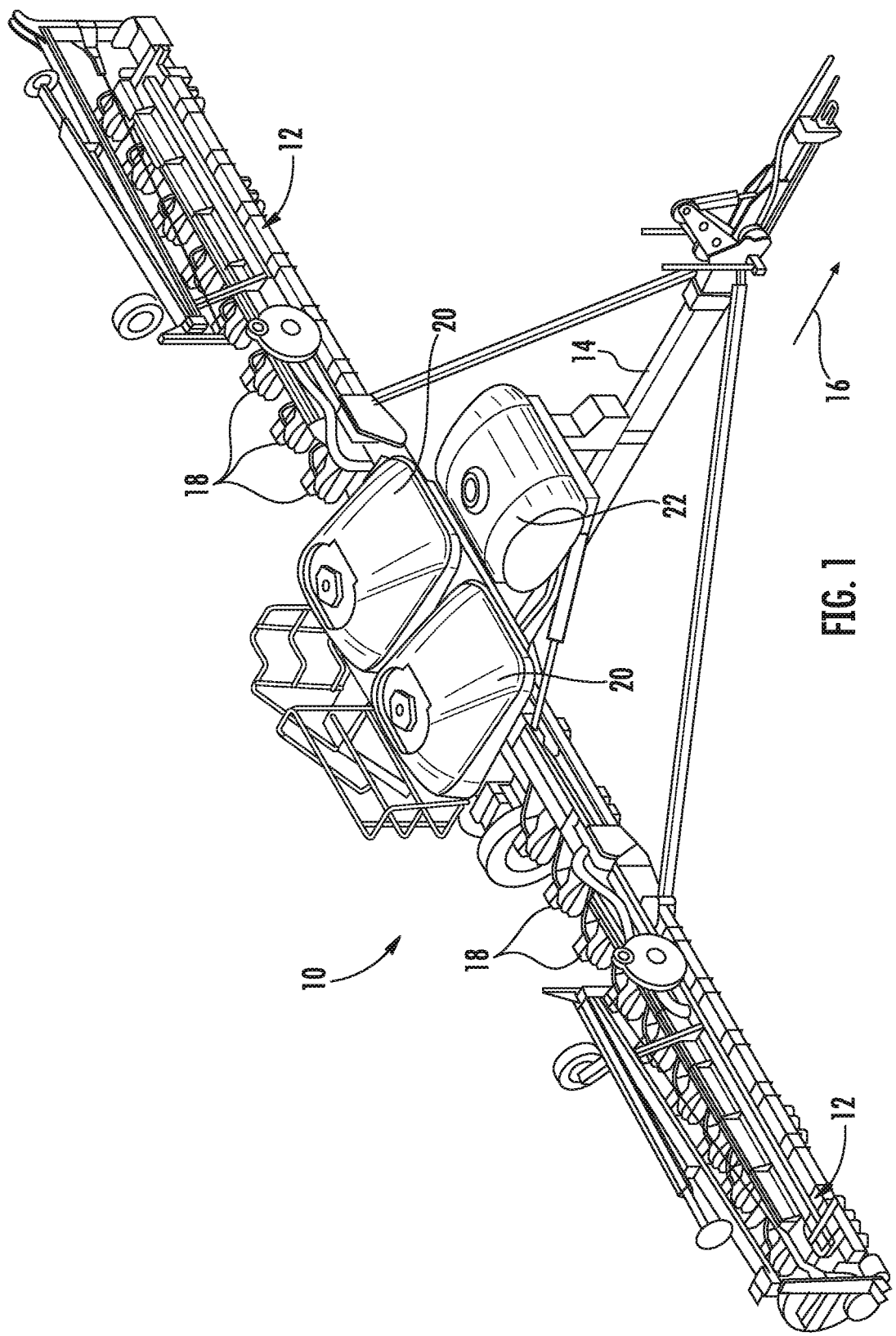
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the operational status of a residue removal device of a seed-planting implement. Specifically, in several embodiments, a controller of the disclosed system may be configured to receive data indicative of a position and/or an acceleration of the residue removal device. The position and/or the acceleration of the residue removal device may, in turn, be indicative of the operational status of the residue removal device. For instance, the controller may be configured to monitor the data received from one or more position and/or acceleration sensors associated with the residue removal device and compare a monitored value to a predetermined threshold value set for the residue removal device.

In several embodiments, the operational status being monitored may be associated with clogging or plugging of the residue removable device. Specifically, a deviation in the monitored position and/or acceleration of the residue removal device relative to a predetermined threshold value (s) as the implement is being towed across the field to perform a seed-planting operation may be indicative of plugging of the residue removal device, such as when a reduction in a range of movement of the residue removal device is detected or when a significant reduction in the acceleration of the residue removal device is detected. As such, the controller may be configured to identify that the residue removal device is plugged when the monitored position/acceleration value differs from the predetermined threshold value(s) set for the residue removable device. The identification of a plugged residue removal device may allow for the operator to take corrective action. Alternatively, the controller may be configured to automatically execute a corrective action adapted to unplug the residue removal device.

In additional or alternative embodiments, the monitored position and/or acceleration of the residue removal device may be compared to a monitored position and/or acceleration of a second residue removal device. In such embodiments, a deviation of the monitored position and/or acceleration of the residue removal device as compared to the monitored position and/or acceleration of the second residue removal device by a given threshold may be indicative of plugging of the residue removal device. For example, a reduction in a range of movement of the residue removal device compared to a range of movement of the second residue removal device or a significant reduction in the acceleration of the residue removal device compared to the acceleration of the second residue removal device may allow the controller to identify that the residue removal device is plugged.

Referring now to the drawings, FIG. 1 illustrates a perspective view of one embodiment of a seed-planting implement 10 in accordance with aspects of the present subject matter. It should be appreciated that, although the seed-planting implement 10 illustrated herein corresponds to a planter, the seed-planting implement 10 may generally correspond to any suitable equipment or implement, such as seeder (e.g., a seed disc drill) or another seed dispensing implement, a side dresser or another fertilizer dispensing implement, a strip tiller, and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration.

Figure 2:
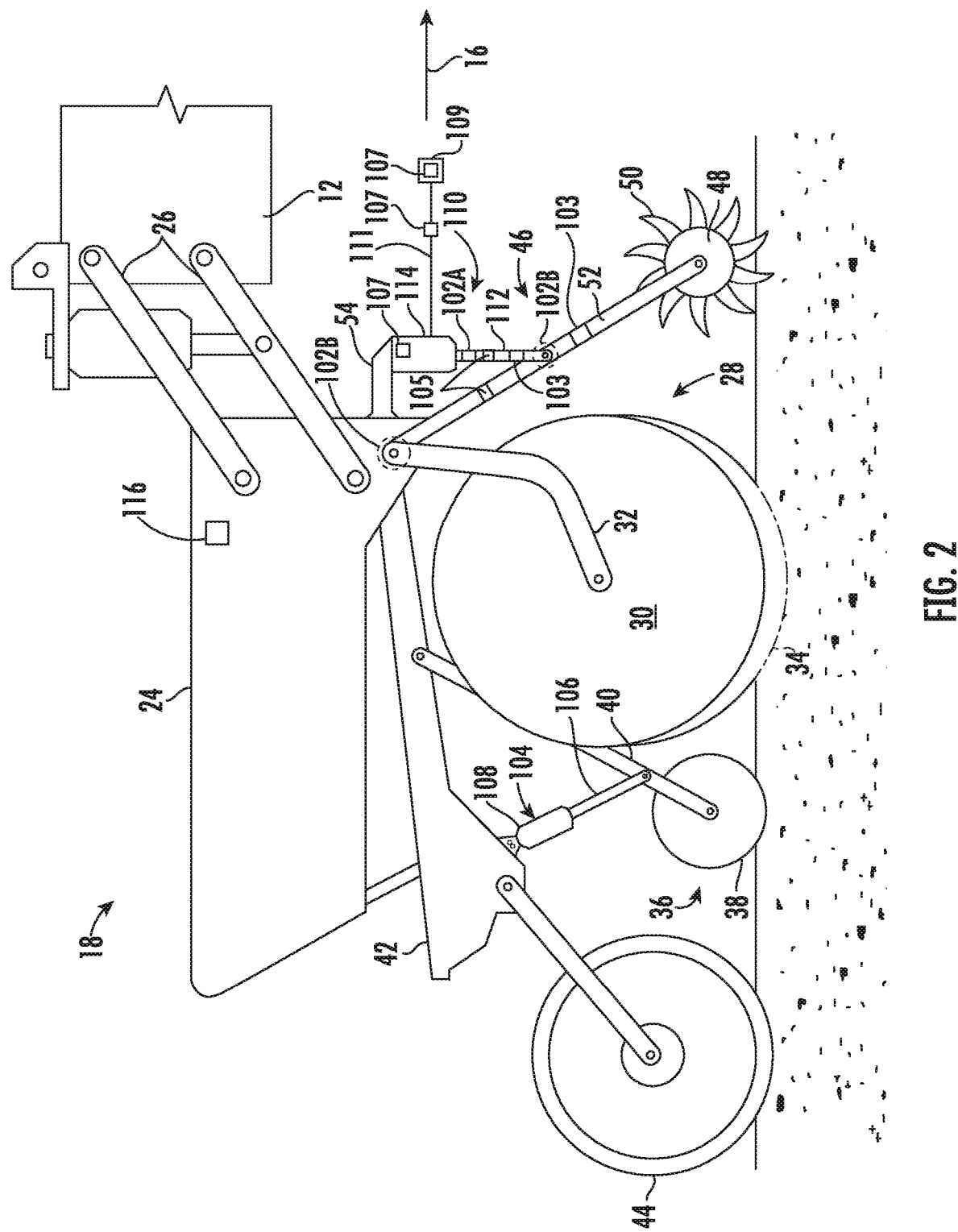
FIG. 2 illustrates a side view of one embodiment of a row unit suitable for use with a seed-planting implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner.

As shown in FIG. 2, the row unit 18 also includes a furrow opening assembly 28. For example, in one embodiment, the furrow opening assembly 28 may include a gauge wheel 30 operatively coupled to the frame 24 of the row unit 18 via a support arm 32. Furthermore, the opening assembly 28 may also include one or more opener discs 34 configured to excavate a furrow or trench in the soil. As is generally understood, the gauge wheel 30 may be configured to engage the top surface of the soil as the implement 10 is moved across the field. In this regard, the height of the opener disc(s) 34 may be adjusted with respect to the position of the gauge wheel 30 to set the desired depth of the furrow being excavated.

Moreover, as shown, the row unit 18 may include a furrow closing assembly 36. Specifically, in several embodiments, the furrow closing assembly 36 may include a pair of closing discs 38 positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38. Additionally, the row unit 18 may include a press wheel 44 configured to roll over the closed furrow to firm the soil over the seed and promote favorable seed-to-soil contact.

In one embodiment, an actuator 104 may be configured to move or otherwise adjust the position of the furrow closing assembly 36 relative to the frame 24. For example, as shown in the illustrated embodiment, a first end of the actuator 104 (e.g., a rod 106 of the actuator 108) may be coupled to the support arm 40 of the furrow closing assembly 36, while a second end of the actuator 104 (e.g., the cylinder 108 of the actuator 104) may be coupled to the chassis arm 42, which is, in turn, coupled to the frame 24. The rod 106 of the actuator 104 may be configured to extend and/or retract relative to the cylinder 108 to adjust the downforce being applied to and/or the penetration depth of the closing disc(s) 38. In addition, such extension and/or retraction may move the furrow closing assembly 36 between an operating position relative to the ground in which the closing disc(s) 38 engages the soil and a raised position relative to the ground in which the closing disc(s) 38 is lifted out of the soil. In the illustrated embodiment, the actuator 104 corresponds to a fluid-driven actuator, such as hydraulic or pneumatic cylinder. However, it should be appreciated that the actuator 104 may correspond to any other suitable type of actuator, such as an electric linear actuator. Additionally, it should be appreciated that, in alternative embodiments, the actuator 104 may control the position(s) of the closing disc(s) 38 by adjusting the downforce being applied to the closing disc(s) 38.

In accordance with aspects of the present subject matter, a residue removal device 46 may be positioned at the forward end of the row unit 18 relative to the direction of travel 16. In this regard, the residue removal device 46 may be configured to break up and/or sweep away residue, dirt clods, and/or the like from the path of the row unit 18 before the furrow is formed in the soil. For example, in one embodiment, the residue removal device 46 may include one or more residue removal wheels 48, with each wheel 48 having a plurality of tillage points or fingers 50. As such, the wheel(s) 48 may be configured to roll relative to the soil as the implement 10 is moved across the field such that the fingers 50 break up and/or sweep away residue and dirt clods. Additionally, the residue removal device 46 may include a support arm 52 configured to adjustably couple the residue removal wheel(s) 48 to the frame assembly 24. For example, one end of the support arm 52 may be pivotably coupled to the wheel(s) 48, while an opposed end of the support arm 52 may be pivotably coupled to the frame 24 or an intermediary component, which is, in turn, coupled to the frame 24. However, it should be appreciated that, in alternative embodiments, the residue removal wheel(s) 48 may be coupled to the frame 24 in any other suitable manner. Furthermore, although only one residue removal wheel 48 is shown in FIG. 2, it should be appreciated that, in alternative embodiments, the residue removal device 46 may include any other suitable number of residue removal wheels 48. For example, in one embodiment, the residue removal device 46 may include a pair of residue removal wheels 48.

In several embodiments, an actuator 110 may be configured to move or otherwise adjust the position of the residue removal device 46 relative to the frame 24. For example, as shown in the illustrated embodiment, a first end of the actuator 110 (e.g., a rod 112 of the actuator 110) may be coupled to the support arm 52 of the residue removal device 46, while a second end of the actuator 110 (e.g., the cylinder 114 of the actuator 110) may be coupled to the bracket 54, which is, in turn, coupled to the frame 24. The rod 112 of the actuator 110 may be configured to extend and/or retract relative to the cylinder 114 to adjust the downforce being applied to the residue removal wheel(s) 48. As such, increasing the downforce being applied to the residue removal wheel(s) 48 may increase the aggressiveness with which the removal wheel(s) 48 breaks up and sweeps away the residue and/or dirt clods. Conversely, decreasing the downforce being applied to the residue removal wheel(s) 48 may decrease the aggressiveness with which the removal wheel(s) 48 breaks up and sweeps away the residue and/or dirt clods. In the illustrated embodiment, the actuator 110 corresponds to a fluid-driven actuator, such as hydraulic or pneumatic cylinder. However, it should be appreciated that the actuator 110 may correspond to any other suitable type of actuator, such as an electric linear actuator.

In several embodiments, one or more position sensors 102 may be provided in operative association with the residue removal device 46 of the row unit 18. In general, the position sensor(s) 102 may be configured to detect a parameter associated with the position of the residue removal wheel(s) 48, such as a position of the residue removal wheel(s) 48 relative to the frame 24 or any other reference position. In one embodiment, the position sensor 102 may correspond to one or more linear displacement sensors 102A configured to detect extension and retraction of the rod 112 of the actuator 110 relative to the cylinder 114, which may be indicative of the relative position of the residue removal wheel(s) 48. For instance, the linear displacement sensor(s) 102A may include a linear potentiometer configured to detect extension and retraction of the rod 112 relative to the cylinder 114. In another embodiment, the linear displacement sensor(s) 102A may be configured as a linear variable differential transformer and/or a linear encoder configured to detect extension and retraction of the rod 112 relative to the cylinder 114. However, in other embodiments, the linear displacement sensor(s) 102A may correspond to any other suitable sensor configured to provide displacement data associated with the actuator 110.

As further illustrated in the exemplary embodiment of FIG. 2, in additional or alternative embodiments, the position sensor 102 may be configured as a rotational sensor 102B. For instance, a rotation sensor 102B may be configured to detect the angle defined between the support arm 52 of the residue removal device 46 and the frame 24 to which the support arm 52 is mounted. The angle between the support arm 52 and the frame 24 may, in turn, be indicative of the position of the residue removal wheel(s) 48. In an additional or alternative embodiment, the rotational sensor 102B may be configured to detect the angle defined between the actuator 110 and the support arm 52. For instance, the rotational sensor may be configured to detect the angle between the rod 112 and the support arm 52. The angle between the support arm 52 and the actuator 110 may, in turn, be indicative of the position of the residue removal wheel(s) 48.

In one embodiment, one or more of the rotational sensors 102B may be configured as a rotary potentiometer, a rotary encoder, and/or the like configured to detect the angle defined between the support arm 52 and the frame 24 and/or the actuator 110. In another embodiment, each rotational sensor 102B may correspond to a gyroscope configured to detect the orientation of the residue removal device 46 relative to a given reference point on the frame 24 and/or relative to the ground. However, in other embodiments, each rotational sensor 102B may correspond to any other suitable sensor configured to provide orientation data associated with its residue removal device 46. For instance, rotational sensor(s) 102B may correspond to an inertial measurement unit (IMU) configured to detect the orientation of the residue removal device(s) 46 relative to a given reference point on the frame 24 and/or relative to the ground.

In general, it should be appreciated that the position sensor 102 may include any sensor having any suitable configuration that allows the sensor(s) to detect a parameter indicative of the position and/or orientation of the residue removal device 46. Furthermore, in certain embodiments, as illustrated in FIG. 2, the position sensor 102 may be configured to determine the position of the residue removal device 46 relative to the frame 24. It should also be appreciated that although the position sensor(s) 102 has been described in the context of a single row unit, one or more position sensors 102 may, for example be provided in operative association with the residue removal device(s) 46 of each row unit 18 to allow the position and/or orientation of such respective residue removal devices to be monitored.

As further illustrated in reference to the exemplary embodiment of FIG. 2, in addition to the position sensor(s) 102 (or as an alternative thereto), one or more acceleration sensors 103 may be provided in operative association with the residue removal device 46 of the row unit 18. In general, the acceleration sensor(s) 103 may be configured to detect a parameter associated with the acceleration of the residue removal wheel(s) 48. For example, in several embodiments, an acceleration sensor(s) 103 may be coupled directly to the residue removal device 46, such as to the support arm 52 or the actuator 110. In one embodiment, the acceleration sensor(s) 103 may be configured as one or more accelerometers or gyroscopes. However, in other embodiments, each acceleration sensor 103 may correspond to any other suitable sensor configured to provide acceleration data associated with the residue removal device 46. Furthermore, in certain embodiments, the acceleration sensor(s) 103 may be configured to provide acceleration data relative to a universal coordinate system. For instance, the acceleration sensor(s) 103 may be configured to provide acceleration data relative to the ground and/or gravity. However, in another embodiment, a second acceleration sensor 116 (e.g., an accelerometer or gyroscope) may be coupled to the row unit frame 24 and configured to detect a parameter associated with the acceleration of the frame 24. In such an embodiment, data from both of the acceleration sensors 103, 116 may be used in combination to monitor the acceleration of the residue removal device(s) 46 relative to the frame(s) 24.

It should be appreciated that although the acceleration sensor(s) 103 has been described in the context of a single row unit, one or more acceleration sensors 103 may, for example, be provided in operative association with the residue removal device(s) 46 of each row unit 18 to allow the acceleration of such respective residue removal devices to be monitored.

As further illustrated in reference to the exemplary embodiment of FIG. 2, in addition to the position sensor(s) 102 and/or acceleration sensor(s) 103 (or as an alternative thereto), one or more force sensors 105 and/or pressure sensors 107 may be provided in operative association with the residue removal device 46. In general, the force sensor(s) 105 and/or pressure sensor(s) 107 may be configured to detect a parameter associated with the acceleration of the residue removal wheel(s) 48.

For instance, as shown, a force sensor(s) 105 may be coupled directly to the residue removal device 46, such as to the support arm 52 or the actuator 110. The force sensor(s) 105 may be configured to detect a parameter associated with the draft load being applied to the residual removal device 46 as the implement 10 is moved across the field, which, in turn, may be indicative of the acceleration of the residue removal wheel(s) 48. Generally, the acceleration acting on the residue removal device 46 may be correlated to forces acting on the residue removal device 46. For example, in one embodiment, the force sensor(s) 105 may be configured as strain gauge(s) mounted on the support arm 52 and configured to detect the force exerted thereon by the draft load on the associated residue removal wheel(s) 48.

Alternatively, one or more of the force sensors 105 may be configured as a load pin or cell configured to be provided in operative association with the residue removal device 46 to monitor the draft load applied thereto. In another embodiment, the force sensor(s) 105 may be configured to detect the down force applied to the residue removal wheel(s) 48. In such an embodiment, the force sensor(s) 105 may correspond to any suitable sensor (e.g., a load cell or pin) and may be configured to be positioned at any suitable location relative to residue removal wheel(s) 48 that allows the sensor 105 to monitor the down force applied through such tool (e.g., by positioning the sensor 105 at or adjacent to a rotational axis of the residue removal device 46). It should be appreciated that, in alternative embodiments, the force sensor(s) 105 may be configured as any other suitable device for sensing or detecting a parameter indicative of the load applied to the residue removal wheel(s) 48. It should be appreciated that although the force sensor(s) 105 has been described in the context of a single row unit, one or more force sensors 105 may, for example, be provided in operative association with the residue removal device(s) 46 of each row unit 18 to allow the draft load acting on such respective residue removal devices to be monitored.

As indicated above, in one embodiment, the actuator 110 may correspond to a fluid-driven actuator, such as hydraulic or pneumatic cylinders. In such an embodiment, a pressure sensor 107 may be provided in association with the actuator 110 and configured to detect a fluid pressure associated with the fluid supplied to the actuator 110, which, in turn, may be indicative of the acceleration of the residue removal wheel(s) 48. For example, as the rod 112 extends and retracts due to the acceleration acting on the residue removal device 46, the local pressure associated with the cylinder 114 may also increase and decrease relative to a set supply pressure. As shown in FIG. 2, the pressure sensor 107 may be provided in fluid communication with a control valve 109 configured to regulate the supply of fluid to the actuator 110 or a fluid coupling 111 extending between the valve 109 and the actuator 110, or the pressure sensor 107 may be provided internally within the actuator 110. It should be appreciated that, in other embodiments, the pressure sensor 107 may correspond to any other suitable sensor capable of sensing or detecting a parameter indicative of the fluid pressure associated with the fluid supplied to the actuator 110. It should be appreciated that although the pressure sensor 105 has been described in the context of a single row unit, one or more pressure sensors 107 may, for example, be provided in operative association with the residue removal device(s) 46 of each row unit 18 to allow the fluid pressure associated with the fluid supplied to the actuator(s) 110 to be monitored.

It should also be appreciated that the configuration of the row unit 18 described above and shown in FIG. 2 is provided only to place the present subject matter in an exemplary field of use. Thus, it should be appreciated that the present subject matter may be readily adaptable to any manner of row unit configuration.

Figure 3:
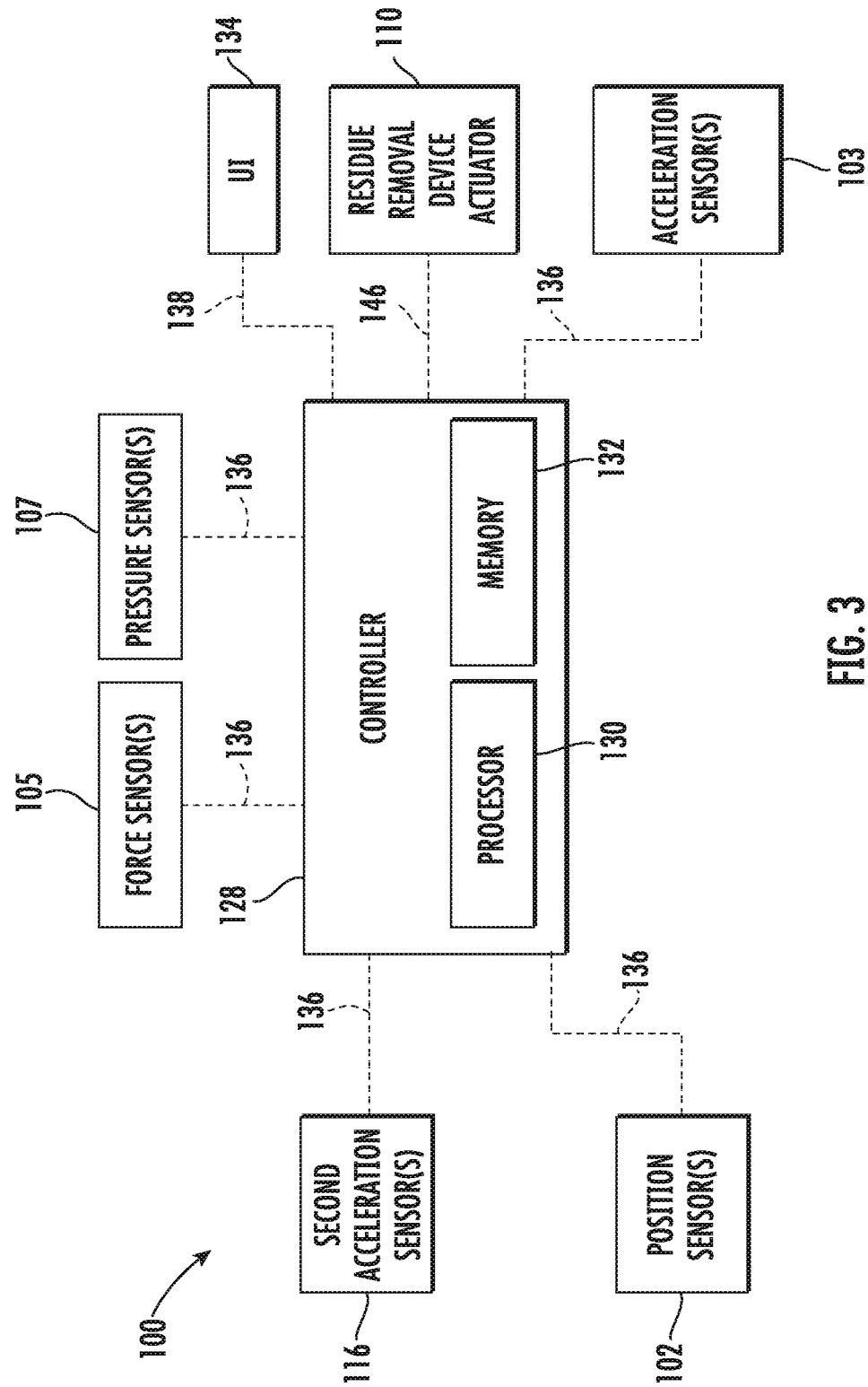
FIG. 3 illustrates a schematic view of one embodiment of a system for detecting the operational status of a residue removal device of a seed-planting implement in accordance with aspects of the present subject matter.

Referring now to FIG. 3, a schematic view of one embodiment of a system 100 for monitoring and/or controlling the operation of a residue removal device of a seed-planting implement is illustrated in accordance with aspects of the present subject matter. More particularly, the system 100 may further generally detect the operational status of a seed-planting implement, such as one or more residue removal devices of a seed-planting implement. In general, the system 100 will be described herein with reference to the implement 10 and row unit 18 described above with reference to FIGS. 1 and 2. However, it should be appreciated by those of ordinary skill in the art that the disclosed system 100 may generally be utilized with seed-planting implements having any other suitable implement configuration and/or row units having any other suitable row unit configuration.

As shown in FIG. 3, the system 100 may include one or more components of the seed-planting implement 10 and/or the row unit 18. For example, in several embodiments, the system 100 may include one or more sensors configured to capture data indicative of one or more operational parameters of the residue removal device 46, such as the position sensor(s) 102, the acceleration sensor(s) 103, the force sensor(s) 105, and/or the pressure sensor(s) 107 described above with reference to FIG. 2. However, it should be appreciated that, in alternative embodiments, the system 100 may include any other suitable components of the implement 10 and/or row unit 18, such as the residue removal device 46 and/or the associated residue removal actuator 110.

In accordance with aspects of the present subject matter, the system 100 may include a controller 128 configured to electronically control the operation of one or more components of the implement 10. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 4. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Furthermore, in one embodiment, the system 100 may also include a user interface 134. More specifically, the user interface 134 may be configured to provide feedback (e.g., notifications associated with the operational parameters of the residue removal device 46) to the operator of the implement 10. As such, the user interface 134 may include one or more feedback devices (not shown), such as display screens, speakers, warning lights, and/or the like, which are configured to communicate such feedback. In addition, some embodiments of the user interface 134 may include one or more input devices (not shown), such as touchscreens, keypads, touchpads, knobs, buttons, sliders, switches, mice, microphones, and/or the like, which are configured to receive user inputs from the operator. In one embodiment, the user interface 134 may be positioned within a cab of a work vehicle configured to tow the implement 10 across the field. However, in alternative embodiments, the user interface 134 may have any suitable configuration and/or be positioned in any other suitable location.

In several embodiments, the controller 128 may be configured to monitor one or more operational parameters of the residue removal device 46 as the implement 10 is being moved across the field. Specifically, in one embodiment, the controller 128 may be communicatively coupled to the position sensor(s) 102 and/or the acceleration sensor(s) 103 associated with the residue removal device 46 of one or more row units 18 via a wired or wireless connection to allow operational parameter data (e.g., as indicated by dashed lines 136 in FIG. 3) to be transmitted from the position sensor(s) 102 and/or the acceleration sensor(s) 103 to the controller 128. As such, the controller 128 may be configured to determine or estimate the position and/or acceleration of the residue removal wheel(s) 48 based on the data 136 received from the sensor(s) 102, 103. For instance, the controller 128 may include a look-up table, suitable mathematical formula, and/or algorithms stored within its memory 132 that correlates the sensor data 136 to the position and/or acceleration of the residue removal wheel(s) 48.

Generally, by monitoring the data 136 associated with the position and/or acceleration of the residue removal device 46, the controller 128 may be able to determine whether a given residue removal devices 46 has become plugged or clogged. Specifically, during operation of the implement 10, the residue removal device(s) 46 (e.g., the residue removal wheels 48) may push foreign substances, such as debris and clods, out of the direction of travel 16 of each row unit 18. In doing so, each residue removal device may generally cyclically move up and down and/or bounce while the residue removal wheel(s) 48 moves such debris out of the path of the row unit 18. However, in certain situations, the residue removal wheel(s) 48 may become clogged with debris and no longer clear the path of the row unit 18. In such situations, the residue removal wheel(s) 48 may undesirably plow through the debris and/or the ground. When this occurs, the magnitude of the generally cyclical up and down motion and/or bouncing of the residue removal wheels(s) 48 is typically reduced. As such, a reduction in the cyclical motion and/or bouncing of the residue removal wheel(s) 48 and/or the residue removal device 46, in general, may indicate that the residue removal wheel(s) 48 is clogged and requires corrective measures.

Accordingly, in several embodiments, the controller 128 may be configured to monitor the sensor data 136 received from the sensor(s) 102, 103 and compare one or more monitored values (e.g., the position and/or the acceleration of the residue removal device 46) to a predetermined threshold value(s) set for the residue removal device 46. The threshold value(s) may, for example, correspond to a position value(s) and/or acceleration value(s) (including position ranges and/or acceleration ranges) selected such that, when the monitored position/acceleration value(s) differs from the corresponding threshold value(s), it may be inferred that the residue removal device 46 is plugged or clogged. It should be appreciated that the predetermined threshold value(s) may be the same for each residue removal device 46. However, in an alternative embodiment, one or more residue removal devices 46 may define distinct predetermined threshold values.

In one exemplary embodiment, the position data 136 received from the position sensor(s) 102 may be monitored to determine a range of movement of one or more of the residue removal devices 46 over time. For instance, the controller 128 may monitor the position data 136 to determine the amplitude of the vertical travel of the residue removal device 46 as it cyclically moves up/down during the operation of the implement 10. In such an exemplary embodiment, the predetermined threshold value(s) used by the controller 128 to detect plugging may, for example, correspond to a predetermined range of movement for the residue removal device 46. For instance, the predetermined range of movement may correspond to a minimum difference between the maximum and minimum positions of the residue removal wheel(s) 48 indicating that the residue removal device(s) 46 is not clogged or plugged. In such instance, the controller 128 may be configured to identify that a residue removal device(s) 46 is plugged when the monitored range of movement of the residue removal device(s) 46 drops below the predetermined range of movement. In an additional or alternative embodiment, the controller 128 may be configured to identify that a residue removal device(s) 46 is plugged when the position of the residue removal wheel(s) 48 exceeds an expected operating range for a predetermined amount of time.

In additional or alternative embodiments, the acceleration data 136 received from the acceleration sensor(s) 103 may be monitored to determine instantaneous acceleration values for the residue removal device(s) 46 and/or average acceleration values for the residue removal device(s) 46 over time. In an additional or alternative embodiment, the acceleration data 136 received from the acceleration sensor(s) 103 may be monitored to determine an amplitude value or frequency value of the acceleration of the residue removal device(s) 46. When using acceleration data 136, the predetermined threshold value(s) used by the controller 128 to detect plugging may, for example, correspond to a predetermined acceleration threshold. For example, the predetermined acceleration threshold may be selected as the minimum acceleration of the residue removal wheels(s) 48 indicating that the residue removal device(s) 46 is not clogged or plugged. In such instance, the controller 82 may be configured to identify a given residue removal device(s) 46 as being plugged when the monitored acceleration value drops below the predetermined acceleration threshold for a predetermined length of time. For example, a plug may be indicated when the monitored acceleration value drops below the predetermined acceleration threshold and stays there for the predetermined length of time.

In certain embodiments, the monitored acceleration value may be associated with the acceleration of the residue removal device 46 relative to a universal frame of reference, such as gravity or the ground. However, in an additional or alternative embodiment, the monitored value may be indicative of an acceleration value of one or more of the residue removal device(s) 46 relative to the frame 24.

In an additional or alternative embodiment, the controller 128 may be configured to determine instantaneous acceleration values for the residue removal device(s) 46 and/or average acceleration values for the residue removal device(s) 46 over time based on data transmitted from the force sensor(s) 105 and/or the pressure sensor(s) 107. Specifically, in one embodiment, the controller 128 may be communicatively coupled to the force sensor(s) 105 and/or the pressure sensor(s) 107 associated with the residue removal device 46 of one or more row units 18 via a wired or wireless connection to allow operational parameter data (e.g., as indicated by dashed lines 136 in FIG. 3) to be transmitted from the force sensor(s) 105 and/or the acceleration sensor(s) 107 to the controller 128. As such, the controller 128 may be configured to determine or estimate the acceleration of the residue removal wheel(s) 48 based on the data 136 received from the sensor(s) 105, 107. For instance, the controller 128 may include a look-up table, suitable mathematical formula, and/or algorithms stored within its memory 132 that correlates the sensor data 136 corresponding to the force data and/or the pressure data to the acceleration of the residue removal wheel(s) 48.

In an additional or alternative embodiment, the controller 128 may be configured to determine one or more residue removal devices 46 are plugged by comparing monitored data 136 associated with multiple residue removal devices 46 across multiple row units of the implement. For instance, the controller may 128 be configured to monitor the sensor data 136 received from the residue removal device 46 and compare the monitored sensor data 136 to monitored sensor data 136 received from sensor(s) 102, 103, 105, 107 associated with a second residue removal device 46 (e.g., a residue removal device 46 of a separate row unit 18). In such instance, the controller 128 may be configured to identify the residue removal device 46 is plugged when a monitored value indicative of the position and/or acceleration of the residue removal device 46 differs from a second monitored value indicative of the position and/or acceleration of the second residue removal device of the separate row unit by a given threshold. In one embodiment, the controller 128 may be configured to determine the residue removal device 46 is plugged when the range of movement of the residue removal device 46 differs (e.g., is less than by predetermined amount) from the range of movement of the second residue removal device. In another exemplary embodiment, the controller 128 may be configured to determine the residue removal device 46 is plugged when the monitored acceleration value of the residue removal device 46 differs (e.g., is less than by a predetermined amount) from the second monitored acceleration value of the second residue removal device.

Though the above determination is based on the comparison of the position and/or acceleration of two residue removal devices 46, it is contemplated such comparison may be utilized with any desirable number of residue removal devices 46. For instance, the monitored position and/or acceleration of a first residue removal device may be compared to the monitored position and/or accelerations of each of the additional residue removal devices to determine whether the first residue removal device is plugged.

Furthermore, the controller 128 may be configured to initiate one or more control actions when the controller 128 determines that one or more of the residue removal devices 46 are plugged. For example, the controller 128 may be configured to notify the operator of the implement 10 that one or more residue removal devices 46 are plugged. Specifically, in one embodiment, the controller 128 may be communicatively coupled to the user interface 134 via a wired or wireless connection to allow feedback signals (e.g., indicated by dashed line 138 in FIG. 3) to be transmitted from the controller 128 to the user interface 134. In such an embodiment, the feedback signals 138 may instruct the user interface 134 to provide a notification to the operator of the implement 10 (e.g., by causing a visual or audible notification or indicator to be presented to the operator) that provides an indication that one or more of the residue removal devices 46 are plugged. In such instances, the operator may then choose to initiate any suitable corrective action he/she believes is necessary, such as adjusting the downforce applied to the residue removal device(s) 46 and/or adjusting the position of the residue removal device(s) 46. For example, the operator may adjust the actuator 110 by retracting the rod 112. As such, the residue removal wheel(s) 48 may rise from an operational position relative to the ground surface as the implement is being moved to a raised position and allow any debris or plug to clear the residue removal device 46. Additionally, raising the residue removal wheel(s) 48 may reduce a down force applied to the residue removal device 46 and cause any debris or plug of the residue removal wheel(s) 48 to force the residue removal device 46 upward and allow the residue removal wheel(s) 48 to clear such obstruction. Additionally, as described below, the controller 128 may be configured to actively control the residue removal device(s) 46 when it is determined that one or more residue removal devices 46 are plugged.

In accordance with aspects of the present subject matter, the controller 128 may be configured to control the operation of the residue removal device 46 based on the monitored operational parameter(s) deriving from the sensor data 136. Specifically, as shown in FIG. 3, the controller 128 may be communicatively coupled to one or more components of the residue removal device 46, such as the actuator 110, via a wired or wireless connection to allow control signals (e.g., indicated by dashed lines 146 in FIG. 3) to be transmitted from the controller 128 to the actuator 110. As such, the controller 128 may be configured to transmit control signals 146 to actuator 110 or associated components (e.g., the control valve 109) instructing the actuator 110 to adjust the downforce being applied to the residue removal device 46, such as by extending or retracting the actuator's rod 112 relative to the corresponding cylinder 114. For example, when it is determined that one or more of the residue removal devices 46 are plugged (e.g., when the range of movement drops below the predetermined range of movement threshold, when the acceleration value drops below the predetermined acceleration threshold, and/or when the range of movement or acceleration value differs between residue removal devices 46), the controller 128 may be configured to transmit control signals 146 to the actuator 110 instructing the actuator 110 to raise the residue removal wheel(s) 48 from the operational position to the raised position and/or reduce the downforce being applied to the residue removal device(s) 46. Additionally, or alternatively, the controller 128 may be configured to transmit control signals to the work vehicle to stop forward motion of the agricultural implement 10. Further, the controller 128 may be configured to transmit control signals to reverse the direction of movement of the agricultural implement 10 to reposition the agricultural implement 10, raise the plugged residue removal device 46 to a raised position, resume forward movement of the agricultural implement 10 to the previous position, and lower the residue removal device 46 to the planting position to continue the planting operation.

Figure 4:
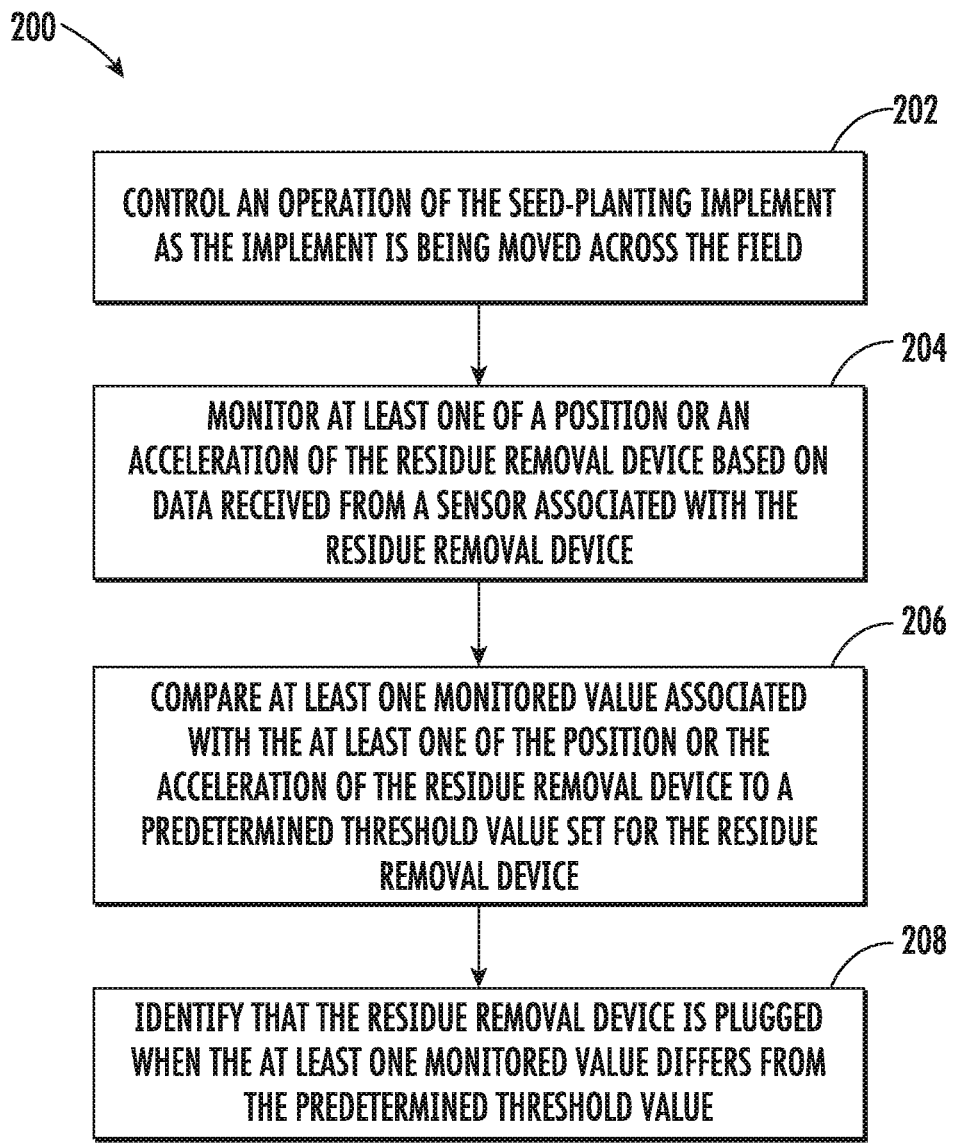
FIG. 4 illustrates a flow diagram of one embodiment of a method for detecting the operational status of a residue removal device of a seed-planting implement in accordance with aspects of the present subject matter.

Referring now to FIG. 4, a flow diagram of one embodiment of a method 200 for detecting the operational status of a residue removal device of a seed-planting implement is illustrated in accordance with aspects of the present subject matter. In general, the method 200 will be described herein with reference to the seed-planting implement 10 and the system 100 described above with reference to FIGS. 1-3. However, it should be appreciated by those of ordinary skill in the art that the disclosed method 200 may generally be utilized to detect the operational status of any seed-planting implement including a residue removal device having any suitable implement configuration and/or in connection with any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include controlling an operation of a seed-planting implement as the implement is being moved across the field. For instance, as described above, the controller 128 may be configured to control the operation of one or more components of the seed-planting implement 10 as the implement 10 is being moved across the field.

Additionally, at (204), the method 200 may include monitoring at least one of a position or an acceleration of a residue removal device based on data received from a sensor associated with the residue removal device. For instance, as described above, the controller 128 may be communicatively coupled to one or more sensors, such as a position sensor(s) 102, acceleration sensor(s) 103, force sensor(s) 105, and/or pressure sensor(s) 107, which are configured to capture data 136 indicative of the position and/or the acceleration of a residue removal device 46. As such, the controller 128 may be configured to monitor the position and/or acceleration of the residue removal device 46 based on the sensor data 136 received from the position sensor(s) 102, the acceleration sensor(s) 103, the force sensor(s) 105, and/or the pressure sensor(s) 107.

Additionally, at (206), the method 200 may include comparing at least one monitored value associated with the position and/or the acceleration of the residue removal device to a predetermined threshold value set for the residue removal device. For example, as described above, the controller 128 may, in one embodiment, be configured to monitor a range of movement of a residue removal device(s) 46 over time based on data 136 received from the position sensor(s) 102 and compare such monitored range of movement to a predetermined range of movement threshold value set for the residue removal device(s) 46. As an additional or alternative example, the controller 128 may be configured to monitor the acceleration of a residual removal device(s) 46 based on data 136 received from the acceleration sensor(s) 103, force sensor(s) 105, and/or pressure sensor(s) 107 and compare such monitored acceleration to a predetermined acceleration threshold value set for the residue removal device(s) 46.

Furthermore, at (208), the method 200 may include identifying that the residue removal device is plugged when the at least one monitored value differs from the predetermined threshold value. In one instance, as described above, the controller 128 may be configured to identify that a residue removal device(s) 46 is plugged when the range of movement of the residue removal device(s) 46 drops below a corresponding predetermined range of movement threshold. In an additional or alternative example, the controller 128 may be configured to identify that the residue removal device(s) 46 is plugged when the acceleration of the residue removal device(s) 46 drops below a corresponding predetermined acceleration threshold value for a predetermined length of time.

In an alternative or additional embodiment, the method 200 may include comparing at least one monitored value associated with the at least one of the position or the acceleration of the residue removal device 46 to a second monitored value indicative of at least one of the position or acceleration of a second residue removal device of a second row unit of the plurality of row units 18. In such an embodiment, the method 200 may further include identifying that the residue removal device 46 is plugged when the at least one monitored value differs from the second monitored value of the second residue removal device by a given threshold. For instance, as explained above, a range of movement of the residue removal device 46 may be compared to a range of movement of the second residue removal device to identify whether the residue removal device 46 is plugged (e.g., when there is a reduction in the range of movement of the residue removal device 46 compared to the range of movement of the second residue removal device by the given threshold). In another example, the acceleration of the residue removal device may be compared to an acceleration of the second residue removal device to identify whether the residue removal device 46 is plugged (e.g., when there is a significant reduction in the acceleration of the residue removal device 46 compared to the acceleration of the second residue removal device).

Moreover, the method 200 may, for example, include initiating a control action when an occurrence of plugging has been identified. For example, as described above, when plugging is identified, the controller 128 may be configured to notify an operator of the seed-planting implement 10, automatically adjust a position of the residue removal device(s) 46 relative to a ground surface across which the seed-planting implement is being moved between an operational position and a raised position, and/or adjust a downforce being applied to the residue removal device(s) 46. Specifically, as described above, the controller 128 may be configured to transmit control signals 138 to the user interface 134 and/or transmit control signals 146 to the residue removal device actuator(s) 110 to adjust one or more operating parameters of the residue removal device(s) 46, such as the position of the residue removal device(s) 46 and/or the downforce being applied thereto, based on the detection of plugging. As another example, the controller 128 may be configured to transmit control signals to stop the forward movement of the agricultural implement 10, reverse the direction of movement of the agricultural implement 10 to reposition the agricultural implement 10, raise the plugged residue removal device 46 to a raised position, resume forward movement of the agricultural implement 10 to the previous position, and/or lower the residue removal device 46 to a planting position to continue the planting operation.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting the operational status of a seed-planting implement, the system comprising:
   a row unit including a frame and a residue removal device coupled to the frame, the residue removal device being configured to remove residue from a path of the row unit;
   a sensor configured to capture data indicative of a change in at least one of a position or an acceleration of the residue removal device in a vertical direction of the residue removal device relative to the frame of the row unit; and
   a controller configured to monitor the data received from the sensor and compare at least one monitored value associated with the change in at least one of the position or the acceleration of the residue removal device to a predetermined threshold value set for the residue removal device, the controller being further configured to identify the residue removal device as being plugged when the at least one monitored value drops below the predetermined threshold value.

2. The system of claim 1, wherein the at least one monitored value is indicative of a range of movement of the residue removal device over time and the predetermined threshold value comprises a predetermined range of movement threshold, the controller being configured to identify the residue removal device as being plugged when the range of movement of the residue removal device drops below the predetermined range of movement threshold.

3. The system of claim 1, wherein the monitored value comprises an acceleration value associated with the acceleration of the residue removal device and the predetermined threshold value comprises a predetermined acceleration threshold, the controller being configured to identify the residue removal device as being plugged when the acceleration value drops below the predetermined acceleration threshold for a predetermined length of time.

4. The system of claim 1, wherein the controller is further configured to initiate a control action when the controller identifies that the residue removal device is plugged.

5. The system of claim 4, wherein the control action comprises notifying an operator of the seed-planting implement that the residue removal device is plugged.

6. The system of claim 4, wherein the control action comprises adjusting a position of the residue removal device relative to a ground surface across which the seed-planting implement is being moved between an operational position and a raised position.

7. The system of claim 4, wherein the control action comprises adjusting a downforce being applied to the residue removal device.

8. The system of claim 1, wherein the sensor comprises at least one of an accelerometer, gyroscope, inertial measurement unit, potentiometer, linear variable differential transformer, encoder, pressure sensor, or force sensor.

9. The system of claim 1, wherein the change in at least one of the position or the acceleration of the residue removal device is defined relative to the frame of the row unit.

10. A method for detecting the operational status of residue removal devices of a seed-planting implement, the implement including an implement frame, a row unit coupled to the implement frame, and a residue removal device associated with the row unit, the residue removal device configured to remove residue from the path of the row unit, the method comprising:
    controlling, with a computing device, an operation of the seed-planting implement as the implement is being moved across the field;
    monitoring, with the computing device, at least one of a position or an acceleration of the residue removal device based on data received from a sensor associated with the residue removal device;
    comparing at least one monitored value associated with the at least one of the position or the acceleration of the residue removal device to a predetermined threshold value set for the residue removal device; and
    identifying that the residue removal device is plugged when the at least one monitored value drops below the predetermined threshold value.

11. The method of claim 10, wherein comparing the at least one monitored value associated with the at least one of the position or the acceleration of the residue removal device to the predetermined threshold value set comprises comparing a range of movement of the residue removal device over time to a predetermined range of movement threshold value set for the residue removal device.

12. The method of claim 11, wherein identifying that the residue removal device is plugged comprises identifying that the residue removal device is plugged when the range of movement of the residue removal device drops below the predetermined range of movement threshold value.

13. The method of claim 10, wherein comparing the at least one monitored value associated with the at least one of the position or the acceleration of the residue removal device to the predetermined threshold value comprises comparing the acceleration of the residue removal device to a predetermined acceleration threshold value set for the residue removal device.

14. The method of claim 13, wherein identifying that the residue removal device is plugged comprises identifying that the residue removal device is plugged when the acceleration of the residue removal device drops below the predetermined acceleration threshold value for a predetermined length of time.

15. The method of claim 10, further comprising:
initiating, with the computing device, a control action when the at least one monitored value differs from the predetermined threshold value.

16. The method of claim 15, wherein initiating, with the computing device, the control action comprises at least one of notifying an operator of the seed-planting implement that the residue removal device is plugged, adjusting a position of the residue removal device relative to a ground surface across which the seed-planting implement is being moved between an operational position and a raised position, or adjusting a downforce being applied to the residue removal device.

17. The method of claim 10, wherein monitoring, with the computing device, the at least one of the position or the acceleration of residue removal device comprises monitoring, with the computing device, the at least one of the position or the acceleration of the residue removal device relative to a frame of the row unit.

18. A seed-planting implement, comprising:
an implement frame;
a plurality of row units coupled to the implement frame, each row unit comprising:
  a frame;
  a residue removal device coupled to the frame, the residue removal device configured to remove residue from the path of the row unit; and
a sensor associated with the residue removal device of at least one row unit of the plurality of row units, the sensor configured to capture data indicative of a change in at least one of a position or an acceleration of the residue removal device in a vertical direction of the residue removal device relative to the frame; and
a controller configured to monitor the data received from the sensor and compare at least one monitored value associated with the change in at least one of the position or the acceleration of the residue removal device to a second monitored value indicative of at least one of a position or an acceleration of a second residue removal device of a second row unit of the plurality of row units, the controller being further configured to identify the residue removal device as being plugged when the at least one monitored value drops below the second monitored value of the second residue removal device by a given threshold.

19. The seed-planting implement of claim 18, wherein the at least one monitored value is indicative of a range of movement of the residue removal device over time, and wherein the plurality of row units further includes a second sensor associated with the second residue removal device of the second row unit of the plurality of row units, the second sensor configured to capture data indicative of the position of the second residue removal device, and wherein the second monitored value comprises a range of movement of the second residue removal device, the controller being configured to identify the residue removal device as being plugged when the range of movement of the residue removal device differs from the range of movement of the second residue removal device by the given threshold.

20. The seed-planting implement of claim 18, wherein the monitored value comprises an acceleration value associated with the acceleration of the residue removal device, and wherein the plurality of row units further includes a second sensor associated with the second residue removal device of the second row unit of the plurality of row units, the second sensor configured to capture data indicative of the acceleration of the second residue removal device, and wherein the second monitored value comprises an acceleration value associated with the acceleration of the second residue removal device, the controller being configured to identify the residue removal device as being plugged when the acceleration value of the residue removal device differs from the acceleration value of the second residue removal device by the given threshold.

* * * * *